United States Patent [19]

Perich et al.

[11] Patent Number: 5,902,511
[45] Date of Patent: May 11, 1999

[54] REFRACTORY COMPOSITION FOR THE PREVENTION OF ALUMINA CLOGGING

[75] Inventors: Regis M. Perich, Boalsburg; Tomas Richter, State College, both of Pa.

[73] Assignee: North American Refractories Co., Cleveland, Ohio

[21] Appl. No.: 08/907,375

[22] Filed: Aug. 7, 1997

[51] Int. Cl.$^6$ .................................................. B22D 41/08
[52] U.S. Cl. .............................. 222/606; 501/99; 501/103
[58] Field of Search ................................ 501/99, 96, 103; 222/606, 607, 590, 591; 266/280, 286

[56] References Cited

U.S. PATENT DOCUMENTS

| | | |
|---|---|---|
| 3,837,894 | 9/1974 | Tucker, Jr. . |
| 4,301,387 | 11/1981 | Schiffarth et al. . |
| 4,317,678 | 3/1982 | Faulring et al. ............................ 75/58 |
| 4,440,568 | 4/1984 | Staggers et al. ............................ 75/53 |
| 4,870,037 | 9/1989 | Hoggard et al. .......................... 301/97 |
| 4,877,705 | 10/1989 | Polidor .................................. 428/34.6 |
| 4,913,408 | 4/1990 | Hoggard et al. ........................ 266/280 |
| 4,989,762 | 2/1991 | Ando et al. .............................. 222/607 |
| 5,082,741 | 1/1992 | Taira et al. .............................. 428/469 |
| 5,086,957 | 2/1992 | Ozeki et al. ............................. 222/607 |
| 5,094,692 | 3/1992 | Dumazeau ............................ 106/286.8 |
| 5,151,201 | 9/1992 | Fishler et al. ........................... 222/600 |
| 5,185,300 | 2/1993 | Hoggard et al. .......................... 501/99 |
| 5,244,130 | 9/1993 | Ozeki et al. ............................. 222/607 |
| 5,370,370 | 12/1994 | Benson .................................. 266/236 |
| 5,505,348 | 4/1996 | Muroi et al. ............................ 222/606 |

FOREIGN PATENT DOCUMENTS

| | | | |
|---|---|---|---|
| 404143050 | 5/1992 | Japan ..................................... | 222/606 |
| 404158962 | 6/1992 | Japan ..................................... | 222/606 |
| 404158963 | 6/1992 | Japan ..................................... | 222/606 |
| 2227962 | 8/1990 | United Kingdom .................. | 222/606 |
| 2240498 | 8/1991 | United Kingdom .................. | 222/606 |

OTHER PUBLICATIONS

Kasai et al., "Explanation of Clogging Phenomena of CC Submerged Nozzle," *Taikabutsu Overseas*, vol. 11, No. 1, pp. 22–33 (Dec. 1990).

Tsukamoto et al., "Optimum Shape Obtained by Hydraulic Model Study an Annular Step Submerged Entry Nozzle and Its Performance," *Taikabutsu Overseas*, vol. 15, No. 1, pp. 43–49 (Dec. 1994).

Iida et al., "Investigation of Anti–alumina Build Up Material for Submerged Entry Nozzle," *Unitecr*, pp. 87–94 (Dec. 1995).

Poirier et al., "Development of New Submerged Nozzles to Reduce Alumina Build up in Continuous Casting," *Unitecr*, pp. 79–86 (Dec. 1995).

Ando et al., "Slit Type Immersion Nozzle of Alumina–Graphite Material," *Unitecr*, pp. 73–78 (Dec. 1995).

Miyagawa et al., "Improvement of Alumina Clogging Suppression Effects on $ZrO_2$–CaO–Graphite," *Taikabutsu Overseas*, vol. 15, No. 1, pp. 50–53 (Dec. 1994).

Ikemoto et al., "Alumina Build–up on ZCG Submerged Nozzle," *Taikabutsu Overseas*, vol. 15, No. 1, pp. 15–21 (Dec. 1994).

Ogibayashi, "Mechanism and Countermeasure of Alumina Buildup on Submerged Nozzle in Continuous Casting," *Taikabutsu Overseas*, vol. 15, No. 1, pp. 3–14 (Dec. 1994).

Hiraga et al., "Behavior of Alumina–Deposition on Tundish Nozzles in Continuous Casting of Ti–Added A1 Killed Steel," *Taikabutsu Overseas*, vol. 15, No. 1, pp. 22–27 (Dec. 1994).

Hoggard et al., "O'Zirconia and Its Refractory Application," *Ceramic Bulltin*, vol. 69, No. 7, pp. 1163–1166 (Dec. 1990)

(List continued on next page.)

*Primary Examiner*—Scott Kastler
*Attorney, Agent, or Firm*—Mark Kusner

[57] ABSTRACT

A molten steel pouring nozzle having a bore therethrough, at least a portion of the nozzle forming the bore being comprised of a refractory having calcium zirconate: from 20 to 75 weight %, graphite: from 5 to 30 weight %, and calcium silicide: from 0.5 to 15 weight %.

18 Claims, 5 Drawing Sheets

OTHER PUBLICATIONS

Yokoyaya et al., "Fused Zirconia–Lime with Different $ZrO_2$/CaO Ratio," *Taikabutsu Overseas*, vol. 12, No. 3, pp. 25–29 (Dec. 1992).

Ozeki et al., "Prevention of Alumina Clogging in Tundish Shrouds," *Proceedings of $2^{nd}$ International Conference on Refractories (Refractories '89 Tokyo)*, Nov. 10–13, 1987, Tokyo, Japan, vol. 1, pp. 398–410.

Shikano et al., "Prevention of Alumina Deposition in Submerged Nozzles," *Taikabutsu Overseas*, vol. 11, No. 1 (Dec. 1990).

Kurata et al., "Prevention of Continuous Casting Submerged Nozzles Clogging," *Taikabutsu Overseas*, vol. 11, No. 1 (Dec. 1990).

Ishi et al., "Prevention of Nozzle Clogging During Continuous Casting of Al–Si Killed Steel," pp. 340–371 (Dec. 1986).

Ishii et al., "Prevention of Nozzle Clogging During Continuous Casting of Al–Si Killed Steel," *Interceram*, Special Issue Dec. 1987, pp. 70–74.

Hayashi et al., "An Investigation of Alumina Deposits on the Bore Surface of Submerged Nozzles," *Proceedings of $2^{nd}$ International Conference on Refractories (Refractories '87 Tokyo)*, Nov. 10–13, 1987, Tokyo, Japan, vol. 1, pp. 384–397.

Kyoden et al., "Prevention of Alumina Buildup in Submerged Entry Nozzle for Continuous Casting of Steel," *Shinagawa Technical Report*, vol. 31, pp. 85–96 (Dec. 1988).

Okumura et al., "Development of Clogging Resistant Materials for Immersion Nozzle," pp. 364–367 No Date.

Nakamura et al., "Immersion Nozzle for Prevention of Alumina Clogging," *Taikabutsu Overseas*, vol. 11, No. 1 (Dec. 1990).

Nakamura et al., "Prevention of Alumina Clogging in Tundish Shrouds," Unitecr '89 (Dec. 1989).

Ozeki et al., "Prevention of Alumina Clogging in Alumina Graphite Shroud," *$70^{th}$ Steelmaking Conference Proceedings*, vol. 70, Pittsburgh Meeting, Mar. 29–Apr. 1, 1987, pp. 139–142.

Robinson et al., "Development of a Sub–Entry Shroud to Prevent Alumina Clogging,"*Vesuvius* (Dec. 1990).

Asano et al., "Mechanism of Alumina Buildup in Submerged Nozzle During Continuous Casting of Low Carbon Aluminum–killed Steel," pp. 324–328. No Date.

Hoggard et al., "Development of Liner to Reduce Lumina Buildup in Graphitized Alumina Submerged Pouring Nozzles Used in the Continuous Casting of Steel," *Proceedings of $2^{nd}$ International Conference on Refractories (Refractories'87 Tokyo)*, Nov. 10–13, 1987, Tokyo, Japan, vol. 1, pp. 411–423.

Ichikawa et al., "The Alumina Buildup in Submerged Entry Nozzle," *Taikabutsu Overseas*, vol. 11, No. 1 (Dec. 1990).

Dawson, "Minimising the Blockage of Tundish Nozzles," LTV Steel Company, pp. 127–134. No Date.

Poirier et al., "Study of Clogging Phenomena in Continuous Casting Submerged Nozzles," pp. 320–323. No date.

Whirlow, "Tundish Nozzle Blockage," Engineering Science No Date.

CZG/0% CaSi$_2$

CZG/2.5% CaSi$_2$

CZG/5.0% CaSi$_2$

CZG/10% CaSi$_2$

REFRACTORY COMPOSITION FOR THE PREVENTION OF ALUMINA CLOGGING

FIELD OF THE INVENTION

The present invention relates generally to refractory compositions and articles made therefrom, for use in the steel making industry, and more particularly, to a molten steel pouring nozzle or sleeve that inhibits reduction or clogging of the bore of a nozzle when an aluminum-killed molten steel flows therethrough.

BACKGROUND OF THE INVENTION

It is generally known in the steel making industry to add aluminum to molten steel as a deoxidizer to remove oxygen from the molten steel. Oxygen may form bubbles or voids within the steel, which detrimentally affect its properties.

When casting an aluminum-killed molten steel, the added aluminum reacts with the oxygen present in the molten steel to produce non-metallic inclusions such as alumina. The aluminum-killed molten steel is typically cast by pouring the molten steel from a conventional ladle into a tundish. A pouring nozzle is secured to the bottom wall of the tundish and directs the molten steel into a mold therebelow. A known problem with aluminum-killed steel is that the α alumina tends to adhere and accumulate on the surface of the bore of the nozzle. This build-up of alumina on the surface of the bore restricts flow therethrough, thereby affecting production performance, as well as product quality.

Nozzles have been developed utilizing special refractory compositions along the surface of the nozzle bore. For example, calcium zirconate graphite refractories have been used to form the inner portion of the nozzle that forms the nozzle bore. This refractory material basically provides calcium oxide (contained in the calcium zirconate) to react with the α alumina to produce low-melting point compounds, such as $CaO.Al_2O_3$ and $3CaO.Al_2O_3$. While calcium zirconate graphite nozzles have improved anti-clogging characteristics over conventional nozzles such as alumina graphite, only the calcium oxide near the surface of the bore tends to react with the α alumina, and once this surface calcium is depleted, the ability of the refractory to prevent adhesion and accumulation of additional a alumina diminishes. It has been known to add calcium silicate ($CaO.SiO_2$) to the calcium zirconate graphite refractory to add additional calcium to the bore lining to facilitate the calcium oxide/alumina reaction. The calcium oxide contained in the calcium silicate basically provides calcium oxide to drive the calcium oxide/alumina reaction. The amount of calcium oxide in the calcium silicate, however, is important in that any calcium oxide that is not dissolved in the form of a solid-solution into calcium silicate, may react violently with water or moisture in the air to deteriorate the structure of the nozzle.

It is therefore highly desirable to add additional calcium oxide to a calcium zirconate graphite nozzle in a form which is resistant to water and moisture in the air, yet will provide the necessary calcium oxide in the presence of molten, aluminum-killed steel to drive the calcium oxide/alumina reaction.

The present invention provides a refractory material for forming the bore of a molten steel pouring nozzle, which refractory is less susceptible to water or moisture, yet provides additional calcium oxide to prevent adherence of alumina impurities on the bore of the pouring nozzle.

SUMMARY OF THE INVENTION

In accordance with the present invention, there is provided a molten steel pouring nozzle having a bore therethrough. At least a portion of the nozzle forming the bore is comprised of a refractory material having calcium zirconate from 20% to 75% by weight, graphite from 5% to 30% by weight, calcium silicide from 0.5% to 15% by weight and zirconia about 15% to 25% by weight.

In accordance with another aspect of the present invention, there is provided a refractory composition comprised by weight of about 15% graphite, about 21% zirconia, about 47% calcium zirconate, about 5% calcium silicide and about 12% binder.

In accordance with another aspect of the present invention, there is provided a method of forming a tubular refractory component comprising the steps of:
 a) preparing a refractory mix comprising the following:
  calcium zirconate: about 40 to 50 weight %,
  graphite: about 10 to 20 weight %,
  calcium silicide: about 2 to 5 weight %,
  zirconia: about 19 to 21 weight %, and
  a binder;
 b) forming a refractory component having a bore extending therethrough, wherein at least a portion of the component forming the bore being comprised of the refractory mix; and
 c) coking the refractory component at about 800° C. to 1500° C.

It is an object of the present invention to provide a pouring nozzle for use with molten, aluminum-killed steel.

Another object of the present invention is to provide a nozzle as described above that retards build-up of impurities along the nozzle bore.

Another object of the present invention is to provide a nozzle as described above wherein the portion of the nozzle that defines the bore is comprised of a refractory comprised primarily of calcium zirconate and graphite.

Another object of the present invention is to provide a nozzle as defined above that includes calcium silicide as an additional source of calcium.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, an embodiment of which is described in detail in the specification and illustrated in the accompanying drawing, wherein.

DETAILED DESCRIPTION OF PREFERRED EMBODIMENT

Figure 2:
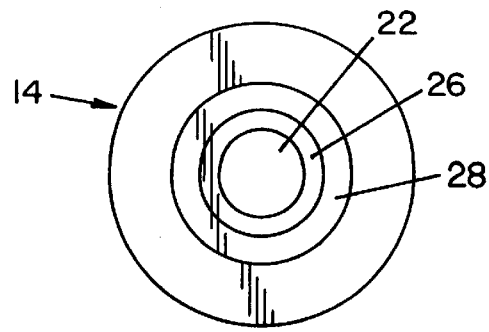
FIG. 2 is a top plan view of the pouring nozzle shown in FIG. 1.
Figure 1:
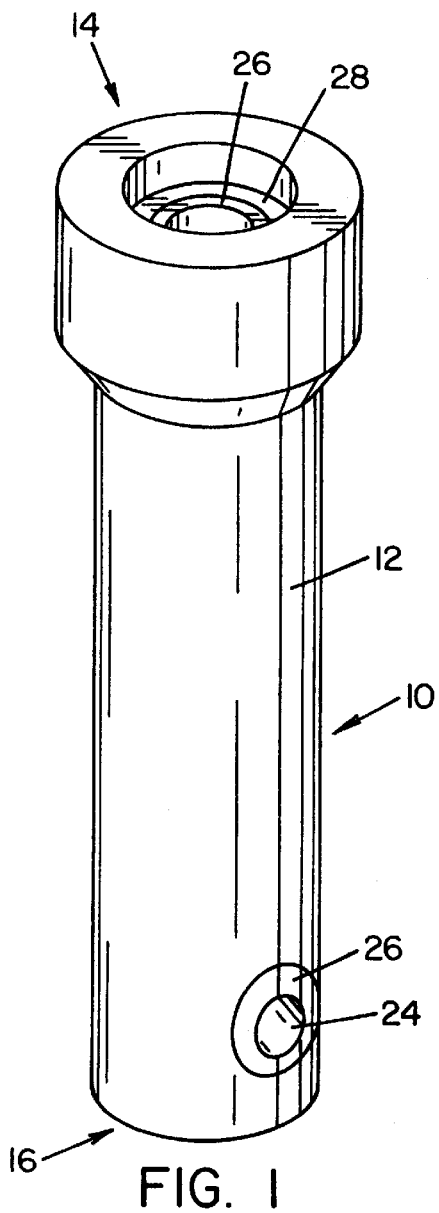
FIG. 1 is a perspective view of a molten steel pouring nozzle illustrating a preferred embodiment of the present invention.
Figure 3:
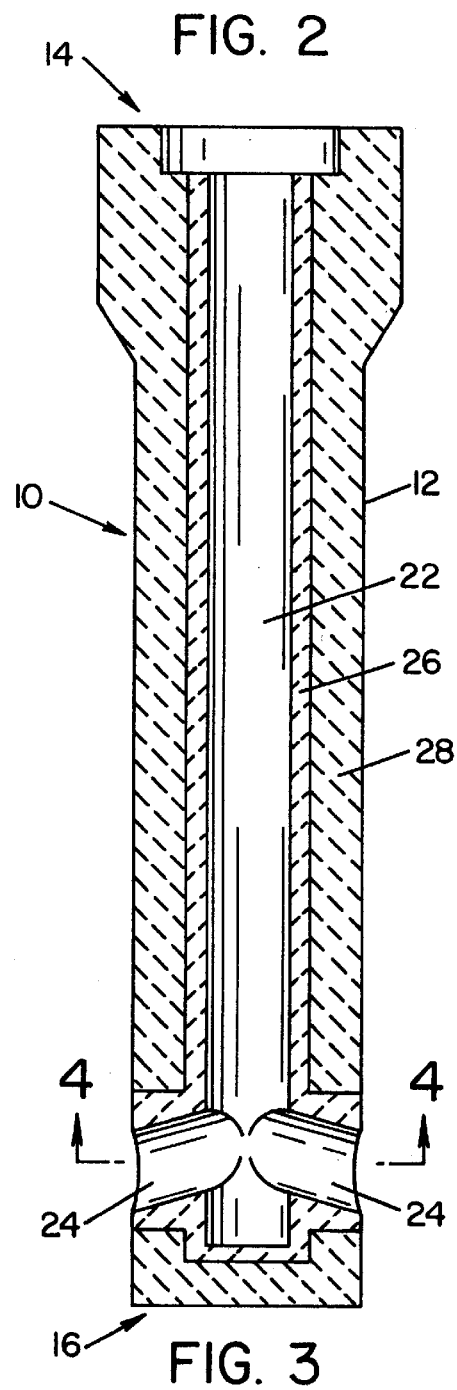
FIG. 3 is a cross-sectional view of the pouring nozzle shown in FIG. 1.
Figure 4:
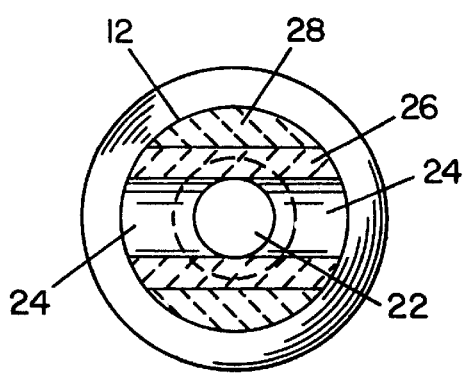
FIG. 4 is a sectional view taken along lines 4—4 of FIG. 3.
Figure 5A:
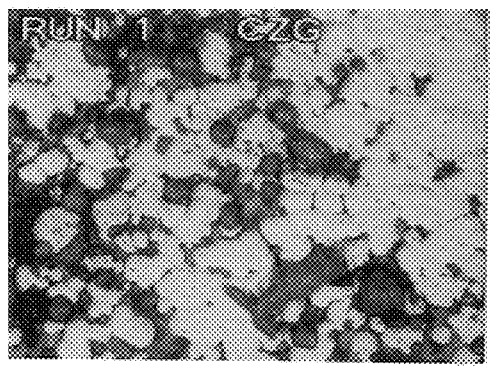
FIGS. 5A, 5B, 5C, 5D, 5E, 5F, 5G, 5H, and 5J are photographs comparing the alumina adhesion characteristics between calcium zirconate graphite refractory bricks and like bricks containing a calcium silicide additive.
Figure 5B:
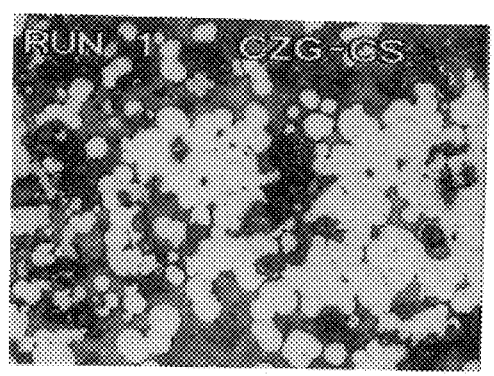
Figure 5C:
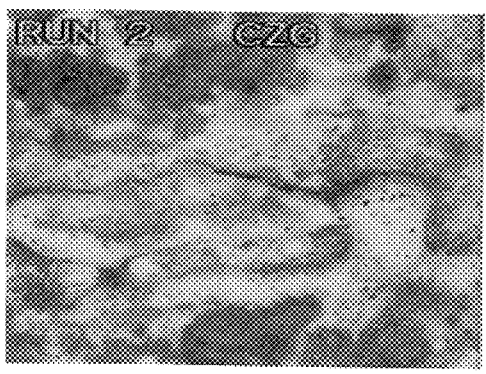
Figure 5D:
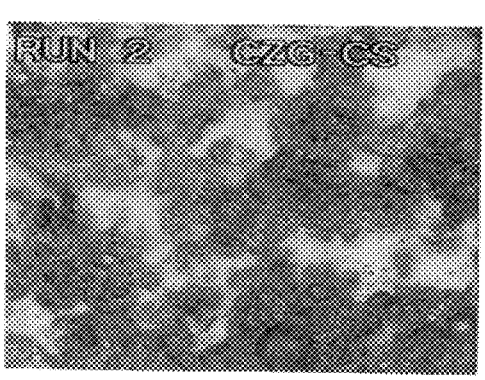
Figure 5E:
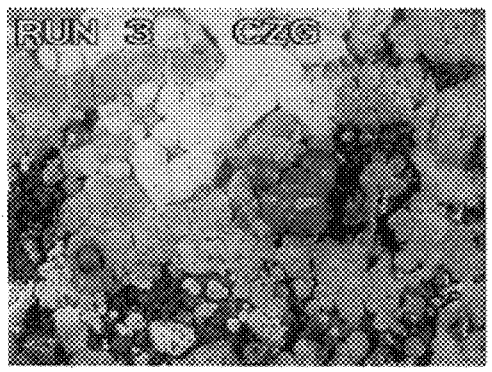
Figure 5F:
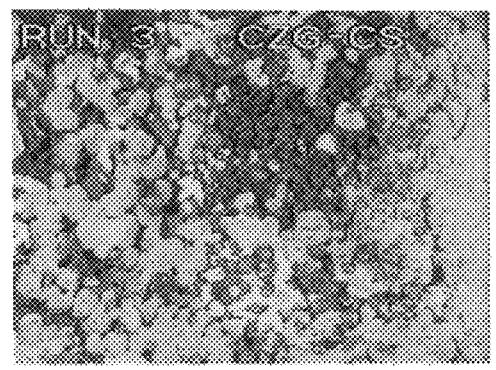
Figure 5G:
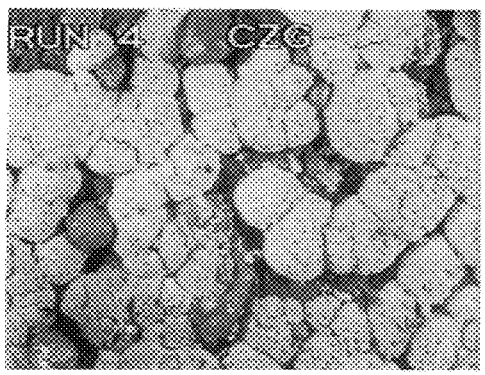
Figure 5H:
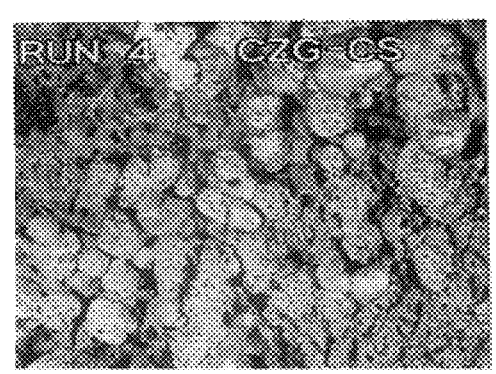
Figure 5I:
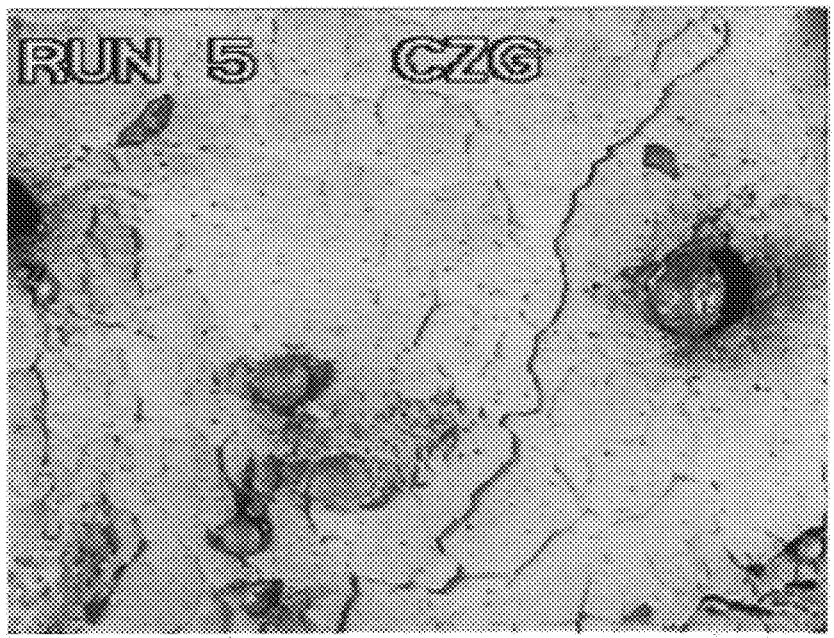
Figure 5J:
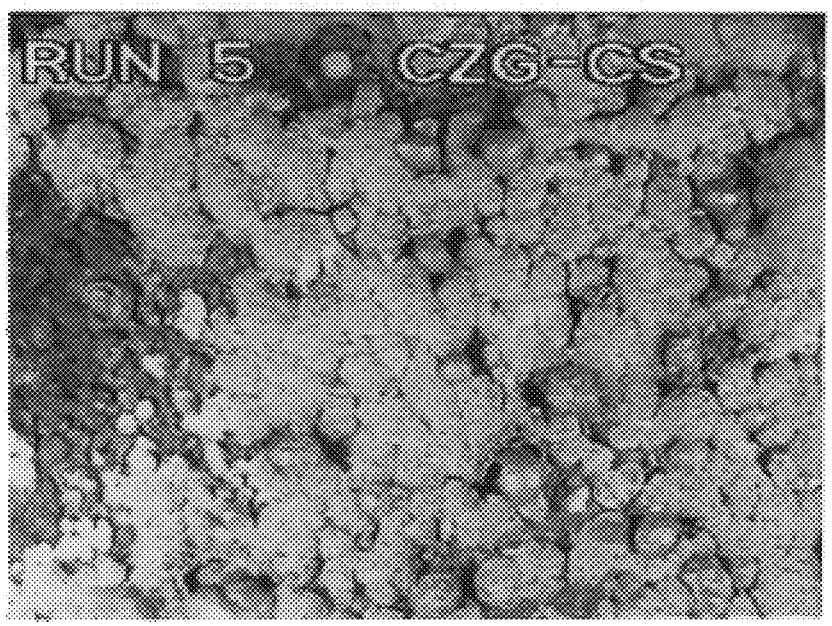
Figure 6A:
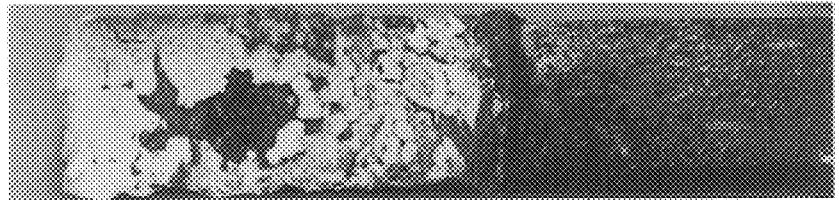
FIGS. 6A, 6B, 6C and 6D are photographs showing alumina adhesion on calcium zirconate graphite refractory bricks containing varying amounts of calcium silicide.
Figure 6B:
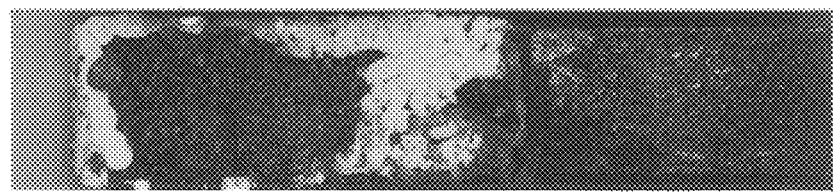
Figure 6C:
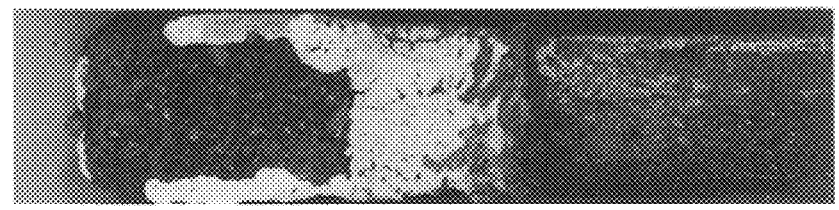
Figure 6D:
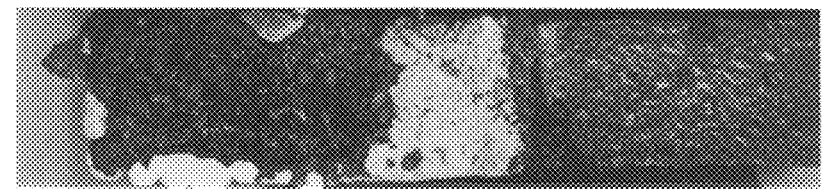

Referring now to the drawing wherein the showing is for the purpose of illustrating a preferred embodiment of the invention, and not for the purpose of limiting same, FIG. 1 shows a pouring nozzle 10 illustrating a preferred embodiment of the present invention. Nozzle 10 is comprised of elongated refractory body 12 having an upper end 14 and a lower end 16. A bore 22 extends through the refractory body 12 from upper end 14 to near lower end 16. Bore 22 communicates with ports 24, which extend through the sirs of nozzle 10.

In accordance with the present invention, a portion of nozzle 10, designated 26 in FIG. 1, is formed of a refractory adapted to retard the accumulation of impurities along the surface of bore 22. An outer portion of nozzle 10, designated 28 in FIG. 1, is preferably formed of a refractory having excellent corrosion resistance against molten steel, for example, alumina graphite.

Referring now to the refractory forming portion 26, the refractory is preferably comprised of calcium-zirconate aggregate and graphite, together with an additive to enhance the anti-clogging characteristics of the calcium zirconate. The additive preferably contributes lime (CaO) to react with alumina in the molten aluminum-killed steel flow that flows through nozzle 10, and at the same time, promotes decomposition of the calcium zirconate aggregate to free more lime (CaO) for reaction.

In accordance with the present invention, the additive is a metal silicide, such as calcium silicide or titanium silicide. Metal silicides are hard, well-defined crystals having relatively high melting points.

A refractory material for forming portion 26 of nozzle 10 shall now be described in more detail by means of an example. A refractory mix formulation having the following composition by weight is prepared.

EXAMPLE 1

| Refractory Composition (with calcium silicide additive) | | |
|---|---|---|
| Raw Material | Particle Size (Tyler Mesh) | % Wt. |
| Graphite | — | 15.0 |
| Calcium Zirconate | −200 | 47.0 |
| Zirconia | −28 + 100 | 21.0 |
| Calcium Silicide | −30 + 200 | 5.0 |
| Binder | — | 12.0 |

In the foregoing mix formulation, calcium silicide powder of the following composition is used.

| Chemical Analysis of Calcium Silicide | | |
|---|---|---|
| | Specification | Typical |
| Calcium | 29%–33% | 32.6% |
| Silicon | 59%–65% | 61.1% |
| Iron | 6.0% max. | 4.2% |
| Carbon | 0.75% max. | 0.41% |
| Sulfur | 0.08% max. | 0.05% |
| Phosphorous | 0.08% max. | 0.04% |

The calcium silicide powder was manufactured by Chemalloy Company, Inc. of Bryn Maur, Pennsylvania. 100% of the calcium siicide has a particle size less than 30 mesh (Tyler) and 30% of the calcium silicide had a particle size less than 200 mesh (Tyler).

The refractory mix formulation is hydraulically pressed into bricks that are about 230 mm long, about 115 mm wide and about 40 mm thick. The bricks are then coked at between 800° C. to 1500° C. In the embodiment disclosed, the bricks are coked at about 1000° C. for about 5 hours. The coked bricks have the following physical properties.

| Physical Properties (Coked) of Refractory | |
|---|---|
| Bulk Density, $lb/ft^3$ ($gm/cm^3$) | 190 (3.04) |
| Porosity, % | 14.9 |
| Specific Gravity | 3.57 |
| Modulus of Rupture, $lb/in^2$ (Mpa) | |
| @ 70° F. (21° C.) | 1500 (10.3) |
| @ 2552° F. (1400° C.) | 710 (4.9) |
| Thermal Expansion, % @ 1000° C. | 0.53 |

A chemical analysis of the refractory shows the following composition by weight.

| Chemical Analysis of Refractory (Weight %) | |
|---|---|
| Carbon (C) (Loss on Ignition, LOI) | 17.8 |
| Silica ($SiO_2$) | 8.2 |
| Alumina ($Al_2O_3$) | 1.3 |
| Calcia (CaO) | 18.5 |
| Zirconia ($ZrO_2$) | 53.3 |

The refractory bricks formed from the foregoing formulation mix are tested against bricks formed from a similar calcium zirconate graphite formulation mix that does not include the calcium silicide additive. The specific composition of the additive free calcium zirconate graphite (CZG) is as follows.

| Raw Material | Particle Size (Tyler Mesh) | % Wt. |
|---|---|---|
| Graphite | — | 15.0 |
| Calcium Zirconate | −200 | 52.0 |
| Zirconia | −28 + 100 | 21.0 |
| Binder | — | 12.0 |

The respective bricks are tested by immersing the bricks in molten aluminum-killed steel for a predetermined period of time. More specifically, 1018 steel is melted in a crucible. Several tests at temperatures between 2800° F. and 2920° F. are conducted. Argon gas is purged over a covered melt. 0.5% of pelletized aluminum is added to the melt. The bricks, without preheat, are immersed in the melt and rotated at a standard it rate for a predetermined period of time. The bricks are then removed and visually inspected for the alumina adherence on the bricks with and without the calcium silicide additives. FIGS. 5A–5J are photographs comparing the alumina adherence (the alumina being lighter in color) for the additive free calcium zirconate graphite (CZG) bricks and calcium zirconate graphite bricks with the calcium silicide (CZG-CS) additive for five separate tests or runs. The maximum temperature of each run is as follows.

| Run #1 | Tmax = 2800° F. |
|---|---|
| Run #2 | Tmax = 2920° F. |
| Run #3 | Tmax = 2850° F. |
| Run #4 | Tmax = 2900° F. |
| Run #5 | Tmax = 2830° F. |

The tests show that the addition of calcium silicide to a calcium zirconate graphite refractory reduces the adherence of alumina onto the refractory.

A further test is conducted to determine the effect that varying amounts of calcium silicide will have on like refractory formulation mixes of calcium zirconate and graphite. Four formulation mixes having the following compositions by percent weight are prepared.

| Raw Material | Particle Size (Tyler Mesh) | Mix 1 (% wt) | Mix 2 (% wt) | Mix 3 (% wt) | Mix 4 (% wt) |
|---|---|---|---|---|---|
| Graphite | | 15 | 15 | 15 | 15 |
| Zirconia | −28 + 100 | 20 | 20 | 20 | 20 |
| Calcium Zirconate | −200 | 52 | 49.5 | 47 | 42 |
| Calcium Silicide | −30 + 200 | 0 | 2.5 | 5 | 10 |
| Binder | | 12 | 12 | 12 | 12 |
| TOTAL | | 99 | 99 | 99 | 99 |

Each formulation mix contains like amounts of graphite, zirconia and powder and liquid resin. The amounts of calcium zirconate are varied based upon the amount of calcium silicide added.

Each formulation mix is hydraulically processed into bricks, and the bricks for each refractory mix are tested for alumina adhesion in molten aluminum-killed steel, by a procedure as described above.

Photographs of representative bricks showing alumina adhesion are set forth in FIGS. 6A–6D. As can be seen from the photographs of FIGS. 6A–6D, the bricks formed of calcium zirconate graphite refractory having calcium silicide added thereto show substantially less alumina adhesion than the calcium zirconate graphite brick having 0% calcium silicide added. FIGS. 6A–6D further show that the resistance to alumina adhesion is not substantially increased, if at all, by the addition of calcium silicide in amounts greater than 2.5% by weight. It is therefore believed that the beneficial effects of calcium silicide to calcium zirconate graphite refractory are optimum at about 2.5% by weight addition of calcium silicide.

The present invention thus provides a pouring nozzle, wherein at least the portion of the pouring nozzle defining the bore and ports is formed of a calcium zirconate graphite refractory including calcium silicide. The invention has been described with respect to preferred embodiments. Modifications and alterations will occur to others upon a reading and understanding of the specification. For example, while FIGS. 1–4 show a pouring nozzle 10, wherein only portion 26 that defines bore 22 is formed of a calcium zirconate and graphite refractory containing calcium silicide, it will be appreciated that the entire nozzle 10 may be formed of such material. It is intended that all such modifications and alterations be included insofar as they come within the scope of the invention as claimed or the equivalents thereof.

Having described the invention, the following is claimed:

1. A molten steel pouring nozzle having a bore therethrough, at least a portion of the nozzle forming said bore being comprised of a refractory having
    calcium zirconate: from 20 to 75 weight %,
    graphite: from 5 to 30 weight %,
    calcium silicide: from 0.5 to 15 weight %, and
    zirconia: from 15 to 25 weight %.
2. A nozzle as defined in claim 1, wherein the entirety of said bore is formed of said refractory.
3. A nozzle as defined in claim 1, wherein the entirety of said nozzle is formed of said refractory.
4. A nozzle as defined in claim 1, wherein
    said calcium zirconate has particle sizes less than 200 Tyler mesh,
    said calcium silicide has particle sizes less than 30 Tyler mesh and greater than 200 Tyler mesh, and
    said zirconia has particle sizes less than 28 Tyler mesh and greater than 100 Tyler mesh.
5. A nozzle as defined in claim 4, wherein said refractory has a porosity of about 15%.
6. A nozzle as defined in claim 1, wherein said refractory is comprised of:
    calcium zirconate: about 40 to 50 weight %,
    graphite: about 10 to 20 weight %,
    calcium silicide: about 2 to 5 weight %, and
    zirconia: about 19 to 21 weight %.
7. A nozzle as defined in claim 6, wherein
    said calcium zirconate has particle sizes less than 200 Tyler mesh,
    said calcium silicide has particle sizes less than 30 Tyler mesh and greater than 200 Tyler mesh, and
    said zirconia has particle sizes less than 28 Tyler mesh and greater than 100 Tyler mesh.
8. A nozzle as defined in claim 7, wherein said refractory has a porosity of about 15%.
9. A refractory composition comprised of, by weight:
    about 15% graphite,
    about 21% zirconia,
    about 47% to 52% calcium zirconate,
    about 1% to 5% calcium silicide, and
    about 12% binder.
10. A refractory composition as defined in claim 9, wherein
    said calcium zirconate has particle sizes less than 200 Tyler mesh,
    said calcium silicide has particle sizes less than 30 Tyler mesh and greater than 200 Tyler mesh, and
    said zirconia has particle sizes less than 28 Tyler mesh and greater than 100 Tyler mesh.
11. A tubular refractory component for use for molten metal, said refractory component having a bore therethrough, at least a portion of said component forming the bore being comprised of:
    zirconia: about 15 to 25 weight %,
    calcium zirconate: about 40 to 50 weight %,
    graphite: about 10 to 20 weight %, and
    a silicide alloy additive selected from the group consisting of calcium silicide and titanium silicide.
12. A refractory component as defined in claim 11, wherein said additive is calcium silicide and is added in amounts of about 2% to 5% by weight.
13. A refractory component as defined in claim 12, wherein
    said calcium zirconate has particle sizes less than 200 Tyler mesh,
    said calcium silicide has particle sizes less than 30 Tyler mesh and greater than 200 Tyler mesh, and
    said zirconia has particle sizes less than 28 Tyler mesh and greater than 100 Tyler mesh.
14. A refractory component as defined in claim 13, wherein said refractory has a porosity of about 15%.
15. A refractory component as defined in claim 11, wherein the entirety of said bore is formed of said refractory.
16. A refractory component as defined in claim 11, wherein the entirety of said refractory component is formed of said refractory.
17. A method of forming a tubular refractory component comprising the steps of:

a) preparing a refractory mix comprised of the following:
   calcium zirconate: about 40 to 50 weight %,
   graphite: about 10 to 20 weight %,
   calcium silicide: about 2 to 5 weight %,
   zirconia: about 19 to 21 weight %, and
   a binder,
b) forming a refractory component having a bore extending therethrough, wherein at least a portion of the component forming the bore being comprised of said refractory mix, and
c) coking said refractory component at about 800° C. to 1500° C.

18. A method as defined in claim 17, comprising coking said refractory component at about 1000° C. for about 5 hours.

* * * * *